US008576665B2

(12) United States Patent
Jiang et al.

(10) Patent No.: US 8,576,665 B2
(45) Date of Patent: Nov. 5, 2013

(54) UNDERWATER WIRELESS SENSOR

(75) Inventors: Joe-Air Jiang, Taipei (TW); Yu-Cheng Yang, Taipei (TW); Wei-Sheng Su, Xindian (TW); Cheng-Long Chuang, Luodong Township, Yilan County (TW); Tzu-Shiang Lin, Taichung (TW)

(73) Assignee: National Taiwan University (TW)

( * ) Notice: Subject to any disclaimer, the term of this patent is extended or adjusted under 35 U.S.C. 154(b) by 461 days.

(21) Appl. No.: 12/940,316

(22) Filed: Nov. 5, 2010

(65) Prior Publication Data

US 2011/0305115 A1    Dec. 15, 2011

(30) Foreign Application Priority Data

Jun. 14, 2010 (TW) ................................ 99119350 A

(51) Int. Cl.
*H04B 11/00* (2006.01)
(52) U.S. Cl.
CPC ...................................... *H04B 11/00* (2013.01)
USPC ......................................................... 367/131
(58) Field of Classification Search
USPC ......................................................... 367/131
See application file for complete search history.

(56) References Cited

U.S. PATENT DOCUMENTS

| 5,894,450 | A | * | 4/1999 | Schmidt et al. | 367/134 |
| 7,187,622 | B2 | * | 3/2007 | Rowe | 367/131 |
| 7,319,411 | B2 | * | 1/2008 | Ong et al. | 340/870.11 |
| 2005/0219950 | A1 | * | 10/2005 | Rowe | 367/118 |
| 2007/0025185 | A1 | * | 2/2007 | Green et al. | 367/124 |
| 2009/0067289 | A1 | * | 3/2009 | Lee et al. | 367/87 |
| 2009/0141591 | A1 | * | 6/2009 | Basilico | 367/128 |

* cited by examiner

*Primary Examiner* — Isam Alsomiri
*Assistant Examiner* — James Hulka
(74) *Attorney, Agent, or Firm* — Allen, Dyer, Doppelt, Milbrath & Gilchrist, P.A.

(57) ABSTRACT

An underwater wireless sensor is provided. The underwater wireless sensor comprises a floating-diving device enabling the underwater wireless sensor to dive to a first predetermined water depth in response to a predetermined condition; a sensing device converting a plurality of environmental parameters into a plurality of environmental messages; a micro controller receiving the environmental messages and sending a command signal including the environmental messages; and a communication device receiving the command signal, sending the command signal via a wireless sensor network, receiving an external message including a second predetermined water depth, and sending the external message to the micro controller so that the micro controller performs a corresponding operation and sends out a control signal to enable the underwater wireless sensor to move to the second predetermined water depth.

8 Claims, 3 Drawing Sheets

UNDERWATER WIRELESS SENSOR

FIELD OF THE INVENTION

The present invention relates to a wireless sensor, and more particularly to an underwater wireless sensor.

BACKGROUND OF THE INVENTION

Due to the economic development and industrialization, the population is increased rapidly so that resources on land are not enough for use. All developed countries are seeking and developing new resources actively. In this regard, the sea is surely the best option because it occupies the largest surface area of the Earth (up to 70%), has the depth of up to eleven thousand meters and possesses almost 90% of resources on the Earth. The sea not only has abundant and various biological resources, but also are rich in a large number of minerals and oil. In recent years, owing to the advancement of micro sensors and the development of communication technologies, the exploitation and exploration of resources are not limited to the distance and space.

Currently, there are two kinds of underwater wireless sensors. The first underwater wireless sensor is implemented by disposing a buoy on the sea surface, and putting down the sensor to the required depth via a cable connected to the buoy. The second underwater wireless sensor is implemented by disposing an anchor at the bottom of the sensor, and pulling the floating sensor with an anchor cable fixed on the seabed. Although the first underwater wireless sensor can control the depth that the sensor submerges to, it is limited to the length and strength of the cable connected to the buoy; besides, it will block the ships on the sea surface from sailing. The second underwater wireless sensor will not block the ships on the sea surface form sailing, but the depth that the sensor submerges to cannot be controlled due to the complicated topography of the sea bed; besides, the sensor will sink at the sea bed forever after it runs out of power, which causes pollution.

In order to overcome the drawbacks in the prior art, an underwater wireless sensor is provided. The particular design in the present invention not only solves the problems described above, but also is easy to be implemented. Thus, the present invention has the utility for the industry.

SUMMARY OF THE INVENTION

In accordance with an aspect of the present invention, an underwater wireless sensor is provided, which uses a floating-diving mechanism and a power recovery mechanism. The floating-diving mechanism includes a plurality of determined diving conditions, which can control the depth that the sensor submerges to via the terminal of the network for meeting the requirements of exploration and sensing. The power recovery mechanism is coordinated by a sensor network program or is controlled by a remote computer. When the sensor runs out of power, it can float to the sea surface for recharge by the solar power. Such power recovery mechanism can substantially prolong the life of the entire wireless sensor network, and solve the problems of searching recycling sensors in the wide sea area and periodically replacing the battery. Through the floating-diving mechanism and the power recovery mechanism, the application of the underwater sensor network will be wider and the exploration of resources will be more convenient. The underwater wireless sensor of the present invention is convenient and useful for the sea pollution monitoring, the military monitoring and the exploration of resources.

In accordance with another aspect of the present invention, an underwater wireless sensor is provided. The underwater wireless sensor comprises a floating-diving device enabling the underwater wireless sensor to submerge to a first predetermined water depth in response to a predetermined condition; a sensing device converting a plurality of environmental parameters into a plurality of environmental messages; a micro controller receiving the environmental messages and sending a command signal including the environmental messages; and a communication device receiving the command signal, sending the command signal via a wireless sensor network, receiving an external message including a second predetermined water depth, and sending the external message to the micro controller so that the micro controller performs a corresponding operation and sends out a control signal to enable the underwater wireless sensor to move to the second predetermined water depth.

Preferably, the predetermined condition is determined according to a task requirement of the wireless sensor network.

Preferably, the floating-diving device comprises at least a pressure gauge, a water-storage tank and a pump.

Preferably, the wireless sensor network comprises a plurality of wireless sensing nodes.

Preferably, the underwater wireless sensor further comprises a charging device supplying power to the underwater wireless sensor, and including one selected from a group consisting of a solar power generator, a salinity-gradient power generator and a thermoelectric power generator.

Preferably, the environmental parameters include ones selected from a group consisting of physical parameters, specific substances and specific objects.

Preferably, the communication device comprises at least an ultrasonic transceiver and a communication chip.

Preferably, the micro controller is one of a chip and an electronic circuit having an operating function.

In accordance with a further aspect of the preset invention, an underwater wireless sensor is provided. The underwater wireless sensor comprises a communication floating-diving device receiving an external message to enable the underwater wireless sensor to move to a predetermined water depth; and a sensing device sensing at least an environmental parameter of a water body, converting the environmental parameter into an environmental message, and sending the environmental message to the communication floating-diving device, wherein the communication floating-diving device sends the environmental message to a master control terminal via a wireless sensor network.

Preferably, the wireless sensor network comprises a plurality of wireless sensing nodes.

Preferably, the underwater wireless sensor further comprises a charging device supplying power to the underwater wireless sensor, and including one selected from a group consisting of a solar power generator, a salinity-gradient power generator and a thermoelectric power generator.

Preferably, the environmental parameter includes one selected from a group consisting of a physical parameter, a specific substance and a specific object.

In accordance with further another aspect of the present invention, an underwater wireless sensor is provided. The underwater wireless sensor comprises a sensing communication device sensing at least an environmental parameter of a water body, converting the environmental parameter into an environmental message, and wirelessly sending the environmental message to a user; and a floating-diving device determining a predetermined water depth of the underwater wireless sensor in the water body in response to the environmental message.

Preferably, the floating-diving device comprises at least a pressure gauge, a water-storage tank and a pump.

Preferably, the underwater wireless sensor further comprises a charging device supplying power to the underwater wireless sensor, and including one selected from a group consisting of a solar power generator, a salinity-gradient power generator and a thermoelectric power generator.

Preferably, the environmental parameter includes one selected from a group consisting of a physical parameter, a specific substance and a specific object.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
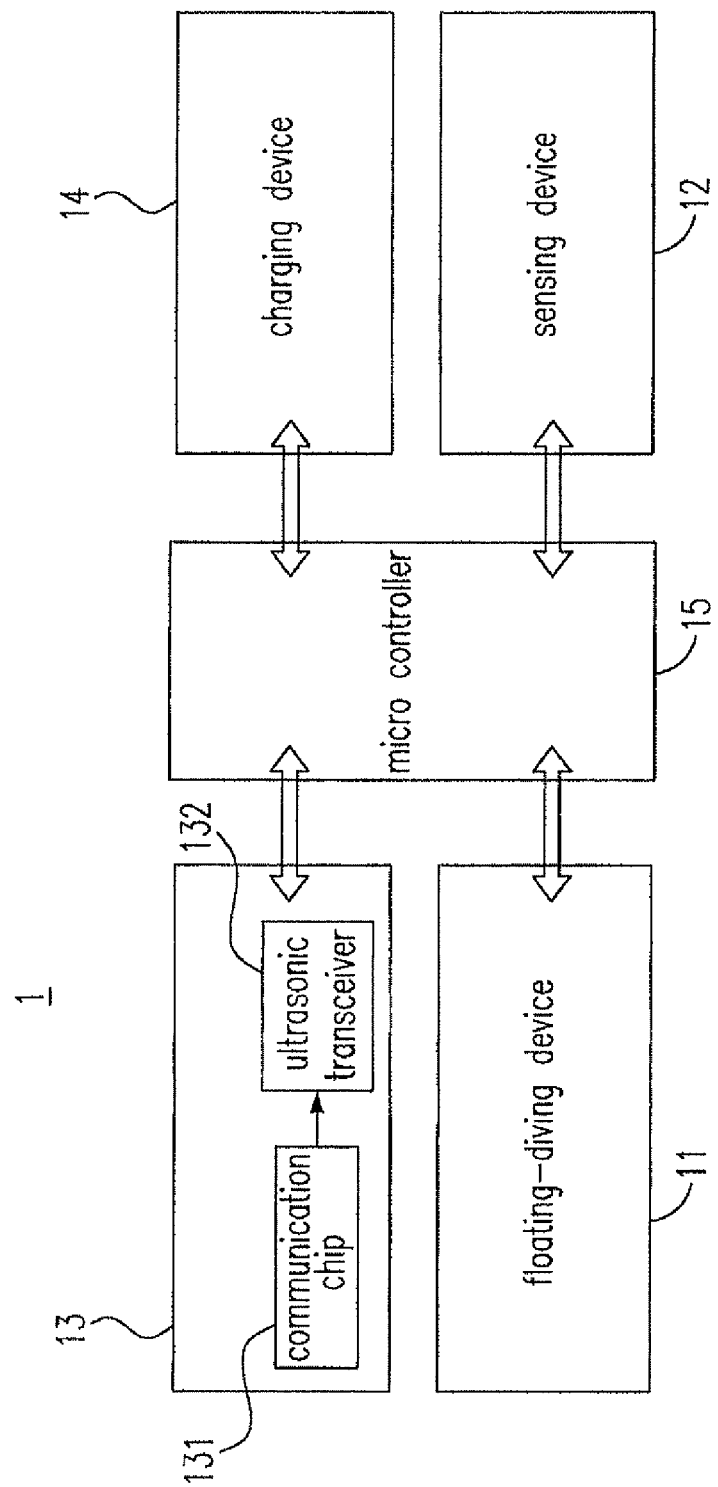
FIG. 1 shows the structure of an underwater wireless sensor according to a preferred embodiment of the present invention.
Figure 2:
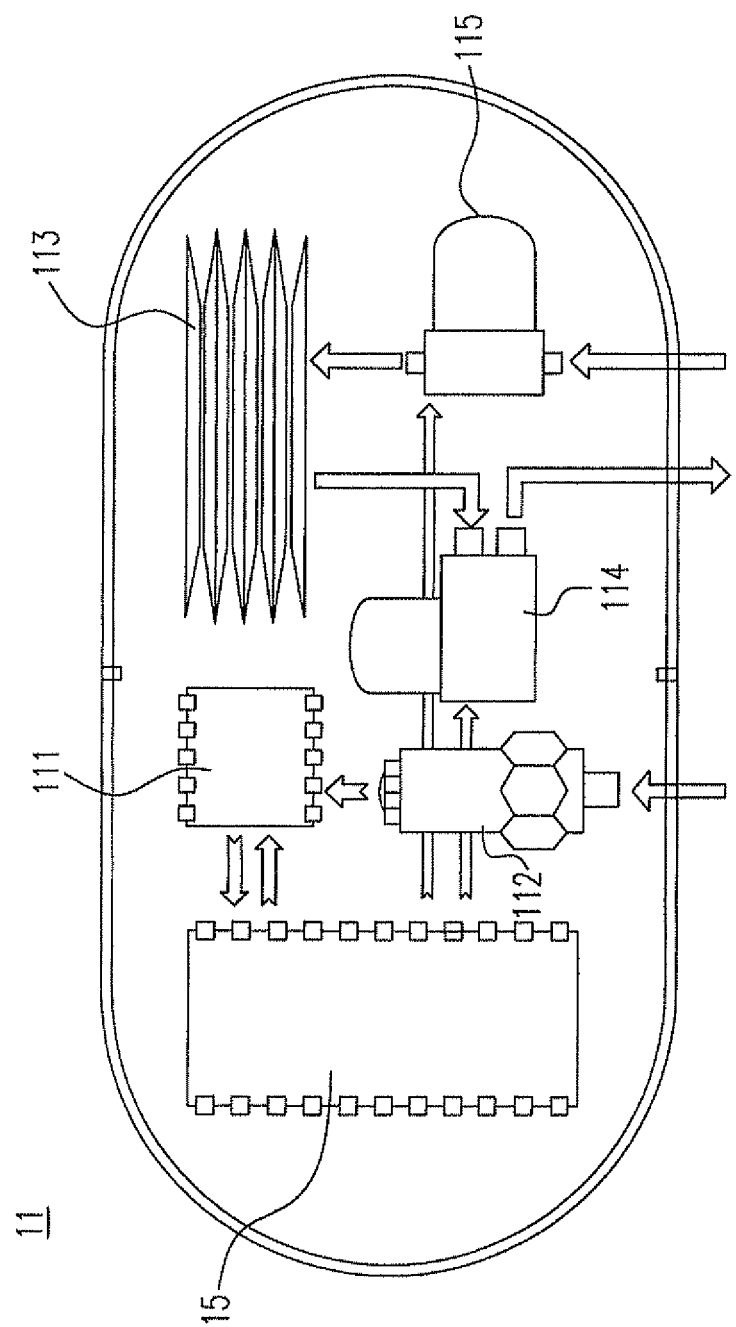
FIG. 2 shows the structure of the floating-diving device in the underwater wireless sensor of FIG. 1.
Figure 3:
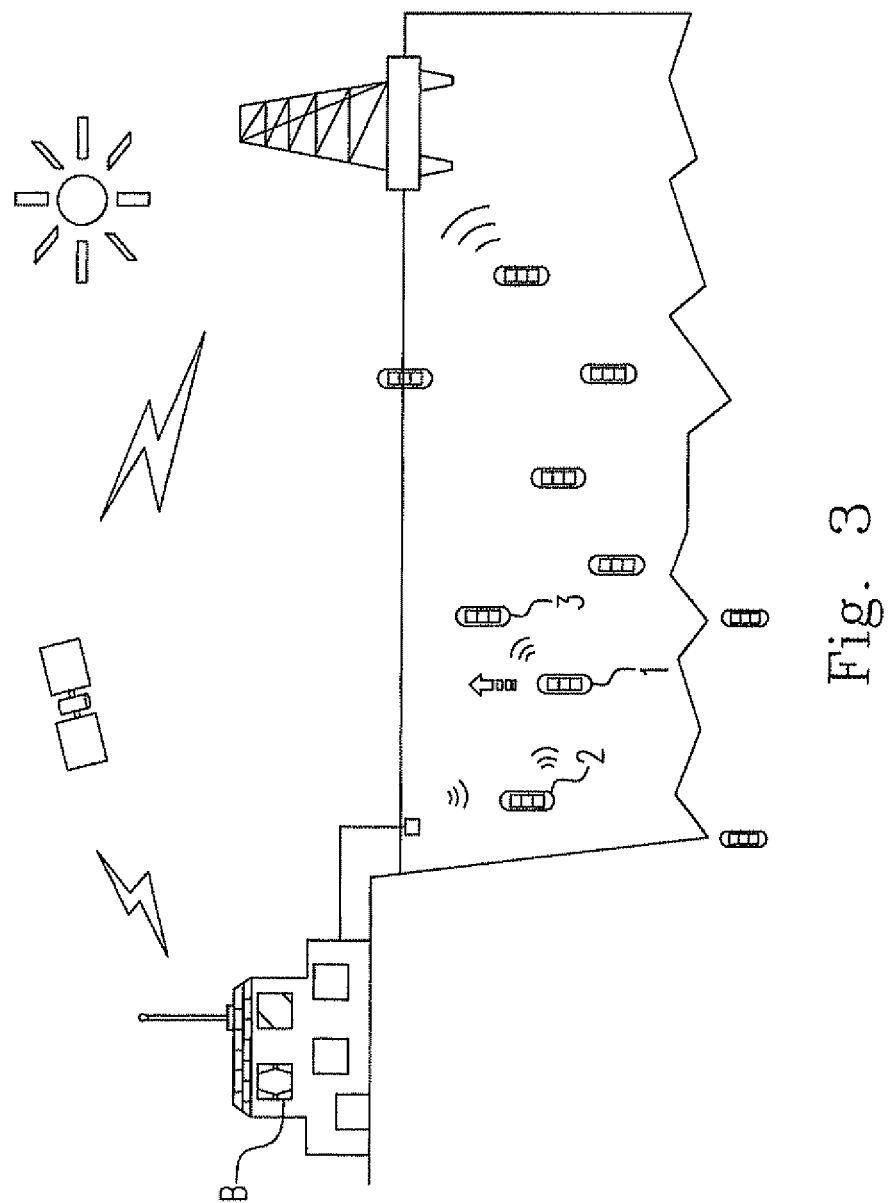
FIG. 3 shows the structure of a wireless sensor network including a plurality of wireless sensor nodes according to a preferred embodiment of the present invention, wherein the wireless sensor network is disposed in the sea for the underwater sensing task.

Please refer to FIG. 1, which shows the structure of an underwater wireless sensor 1 according to a preferred embodiment of the present invention. The underwater wireless sensor 1 includes a floating-diving device 11, a sensing device 12, a communication device 13, a charging device 14 and a micro controller 15 (e.g. a chip or an electronic circuit having an operating function). Please refer to FIG. 2, which shows the structure of the floating-diving device 11 in the underwater wireless sensor 1 of FIG. 1. The floating-diving device 11 includes a converter 111, a pressure gauge 112, a water-storage tank 113, a pump 114 and an electromagnetic valve 115. The floating-diving device 11 is disposed inside the underwater wireless sensor 1, and enables the underwater wireless sensor 1 to submerge to a predetermined water depth in response to a predetermined condition. For example, when an external message indicating that the predetermined water depth is 200 meters is pre-sent to the micro controller 15 and the current water depth for the floating-diving device 11 is 0 meter, the pressure gauge 112 generates an analog signal and sends it to the converter 111. Then, the converter 111 converts the analog signal into a digital signal so that the micro controller 15 can determine whether the current water depth for the underwater wireless sensor 1 is equal to the predetermined water depth of 200 meters. If not, the micro controller 15 will control the pump 114 and the electromagnetic valve 115 to change the quantity of water in the water-storage tank 113 (adding or draining water) according to the displacement for the predetermined water depth of 200 meters, until the underwater wireless sensor 1 submerges to the predetermined water depth of 200 meters. The sensing device 12 collects environmental parameters with respect to the predetermined water depth of 200 meters. For example, the environmental parameters can be the water temperature, the water pressure, the quantity of oxygen in water, the content of pollutants, etc. The sensing device 12 sends a data signal including the environmental parameters to the micro controller 15. The micro controller 15 receives the data signal and sends a command signal including the data signal to a communication chip 131 in the communication device 13 for signal modulation and amplification, so as to drive an ultrasonic transceiver 132 in the communication device 13. The ultrasonic transceiver 132 performs mechanical oscillation for the amplified signal to generate an ultrasonic signal, and sends it to a master control terminal B (also referred to as a base station B) disposed at the land, the sea or a flight vehicle via a wireless sensor network including a plurality of wireless sensor nodes, as shown in FIG. 3. In FIG. 3, the underwater wireless sensor 1 functions as a wireless sensing node.

Besides, as shown in FIG. 3, when the underwater wireless sensor 1 with the water depth of 200 meters is to float to a predetermined water depth of 150 meters, the following processes are performed. The master control terminal B sends out an external message with respect to the predetermined depth of 150 meters via the nearest underwater wireless sensor 2. At this time, the communication chip 131 in the underwater wireless sensor 2 sends the external message to the ultrasonic transceiver 132 of the communication device 13 in the underwater wireless sensor 1. The ultrasonic transceiver 132 generates an analog oscillation signal and sends it to the communication chip 131 for modulation and analysis to obtain an analysis result. Then, the communication chip 131 sends the analysis result to the micro controller 15. Subsequently, the micro controller 15 determines whether the current water depth for the underwater wireless sensor 1 is equal to the predetermined water depth of 150 meters. If not, the micro controller 15 will control the pump 114 and the electromagnetic valve 115 to change the quantity of water in the water-storage tank 113 (adding or draining water) according to the displacement for the predetermined water depth of 150 meters, until the underwater wireless sensor 1 floats to the predetermined water depth of 150 meters. The sensing device 12 collects environmental parameters with respect to the predetermined water depth of 150 meters. For example, the environmental parameters can be the water temperature, the water pressure, the quantity of oxygen in water, the content of pollutants, etc. The sensing device 12 sends a data signal including the environmental parameters to the micro controller 15. The micro controller 15 receives the data signal and sends a command signal including the data signal to a communication chip 131 in the communication device 13 for signal modulation and amplification, so as to drive the ultrasonic transceiver 132 in the communication device 13. The ultrasonic transceiver 132 performs mechanical oscillation for the amplified signal to generate an ultrasonic signal, and sends it to the master control terminal B via the wireless sensor network including the wireless sensor nodes.

Preferably, the charging device 14 for supplying power to the underwater wireless sensor is a solar power generator. Alternatively, the charging device 14 can also be a salinity-gradient power generator or a thermoelectric power generator. When the charging device 14 is a solar power generator and the underwater wireless sensor 1 serving as a wireless sensing node runs out of power, the micro controller 15 sends out a command signal to the floating-diving device 11 to drain a proper quantity of water from the water-storage tank 113 therein. This enables the underwater wireless sensor 1 to float to the sea surface or to an area pervious to light so that the charging device 14 can absorb sunlight for charging. At this time, one or a plurality of underwater wireless sensors near the underwater wireless sensor 1 float/submerge into the working radius of the original water depth for the underwater wireless sensor 1 so as to support the subsequent sensing task of the underwater wireless sensor 1.

According to another preferred embodiment of the present invention, an underwater wireless sensor is provided. The underwater wireless sensor includes a communication floating-diving device receiving an external message to enable the underwater wireless sensor to move to a predetermined water depth; and a sensing device sensing at least an environmental parameter of a water body (e.g. the water body of seawater or the water body of fresh water), converting the environmental parameter into an environmental message, and sending the environmental message to the communication floating-diving device, wherein the communication floating-diving device sends the environmental message to a master control terminal via a wireless sensor network. In this embodiment, the communication floating-diving device combines the communication function with the floating-diving function.

According to a further embodiment of the present invention, an underwater wireless sensor is provided. The underwater wireless sensor includes a sensing communication device sensing at least an environmental parameter of a water body, converting the environmental parameter into an environmental message, and wirelessly sending the environmental message to a user; and a floating-diving device determining a predetermined water depth of the underwater wireless sensor in the water body in response to the environmental message. In this embodiment, the sensing communication device combines the sensing function with the communication function.

In conclusion, the present invention can greatly improve the operating mode of the current underwater wireless sensor network. This enables the researcher or user to arrange the exploration task and charging schedule by himself so that the requirement of the underwater exploration task can be satisfied.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless sensor network comprising:
   a master control terminal; and
   a plurality of wireless sensor nodes directly communicating with the master control terminal and configured as a plurality of underwater wireless sensors, with each underwater wireless sensor comprising
      a floating-diving device enabling the underwater wireless sensor to submerge to a first predetermined water depth in response to a predetermined condition,
      a sensing device converting a plurality of environmental parameters into a plurality of environmental messages,
      a micro controller connected to the floating-diving device and the sensing device, and receiving the environmental messages and sending a command signal including the environmental messages,
      a communication device connected to the micro controller, receiving the command signal sent from the micro controller, sending the command signal to the master control terminal, receiving an external message including a second predetermined water depth from the master control terminal, and sending the external message to the micro controller so that the micro controller performs a corresponding operation and sends out a control signal to the floating-diving device to enable the underwater wireless sensor to move to the second predetermined water depth, and
      a solar power generator generating power, storing the power, and supplying the power to the underwater wireless sensor,
   the plurality of underwater wireless sensors including first and second underwater wireless sensors, with the first underwater wireless sensor being located at a working water depth and having a working radius, and when the power of the first underwater wireless sensor is insufficient, the first underwater wireless sensor moves to a specific area so that the solar power generator absorbs external light to be charged, and the second underwater wireless sensor moves into the working radius.

2. A wireless sensor network as in claim 1, wherein the predetermined condition is determined according to a task requirement of the wireless sensor network.

3. A wireless sensor network as in claim 1, wherein the floating-diving device comprises at least one of a pressure gauge, a water-storage tank and a pump.

4. A wireless sensor network as in claim 1, wherein the environmental parameters include ones selected from a group consisting of physical parameters, specific substances and specific objects.

5. A wireless sensor network as in claim 1, wherein the communication device comprises at least an ultrasonic transceiver and a communication chip.

6. A wireless sensor network as in claim 1, wherein the micro controller is one of a chip and an electronic circuit having an operating function.

7. A wireless sensor network as in claim 1, wherein the first underwater wireless sensor is located at the working water depth to perform a sensing task; and
   when the first underwater wireless sensor runs out of the power it floats to the specific area to absorb the external light, and the second underwater wireless sensor moves into the working radius to continue the sensing task; and
   wherein the specific area is one of a sea surface and an area pervious to light, and the external light is sunlight.

8. A wireless sensor network as in claim 7, wherein the second underwater wireless sensor moves to the working water depth of the first underwater wireless sensor when the first underwater wireless sensor moves to the specific area.

* * * * *